United States Patent
Güzelarslan (10) Patent No.: US 11,322,173 B2
(45) Date of Patent: May 3, 2022

(54) EVALUATION OF SPEECH QUALITY IN AUDIO OR VIDEO SIGNALS

(71) Applicant: Rohde & Schwarz GmbH & Co. KG, Munich (DE)

(72) Inventor: Baris Güzelarslan, Ottobrunn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 195 days.

(21) Appl. No.: 16/448,924

(22) Filed: Jun. 21, 2019

(65) Prior Publication Data

US 2020/0402530 A1    Dec. 24, 2020

(51) Int. Cl.
| | | |
|---|---|---|
| *G10L 25/69* | (2013.01) | |
| *H04M 7/00* | (2006.01) | |
| *G10L 19/08* | (2013.01) | |
| *G10L 25/90* | (2013.01) | |
| *G10L 21/0208* | (2013.01) | |
| *H04M 3/22* | (2006.01) | |

(52) U.S. Cl.
CPC .............. *G10L 25/69* (2013.01); *G10L 19/08* (2013.01); *G10L 21/0208* (2013.01); *G10L 25/90* (2013.01); *H04M 3/2236* (2013.01); *H04M 7/006* (2013.01)

(58) Field of Classification Search
CPC ..... G10L 25/69; G10L 19/08; G10L 21/0208; G10L 25/30; G10L 25/60; H04M 7/006; H04M 3/2236
See application file for complete search history.

(56) References Cited

U.S. PATENT DOCUMENTS

| | | | | |
|---|---|---|---|---|
| 6,119,083 | A * | 9/2000 | Hollier | G10L 19/018 348/742 |
| 8,467,893 | B2 * | 6/2013 | Grancharov | G10L 25/69 700/94 |
| 10,380,185 | B2 * | 8/2019 | Jin | H04L 67/10 |

(Continued)

FOREIGN PATENT DOCUMENTS

| | | |
|---|---|---|
| DE | 19882404 B3 | 10/2012 |
| WO | 9853630 A1 | 11/1998 |
| WO | 9859509 A1 | 12/1998 |

OTHER PUBLICATIONS

Sheng (A Feature Learning Siamese Model for Intelligent Control of the Dynamic Range Compressor; arXiv:1905.01022v1 [eess.AS] May 1, 2019) (Year: 2019).*

(Continued)

*Primary Examiner* — Matthew H Baker
(74) *Attorney, Agent, or Firm* — Ditthavong, Steiner & Mlotkowski (57) ABSTRACT

An apparatus for generating a score signal representing the quality of an audio or video signal supplied to the apparatus is proposed. The apparatus comprises: an input for supplying an audio or video signal, a computing unit implementing a neural network, the computing unit being supplied with the audio or video signal, and producing a score signal representing the quality of an audio or video signal supplied representing at least one predefined quality parameter of the audio or video signal, the neural network being set up by being trained with training data of a specific transmission standard and/or codec used for generating the audio or video data.

10 Claims, 8 Drawing Sheets

(56) References Cited

U.S. PATENT DOCUMENTS

| | | | | |
|---|---|---|---|---|
| 10,984,818 | B2* | 4/2021 | Xiao | G10L 25/03 |
| 2008/0249769 | A1* | 10/2008 | Baumgarte | G10L 25/69 |
| | | | | 704/227 |
| 2009/0099843 | A1* | 4/2009 | Barriac | G10L 25/69 |
| | | | | 704/200.1 |
| 2011/0305345 | A1* | 12/2011 | Bouchard | G10L 21/0208 |
| | | | | 381/23.1 |
| 2014/0358526 | A1* | 12/2014 | Abdelal | G10L 15/16 |
| | | | | 704/202 |
| 2015/0112672 | A1* | 4/2015 | Giacobello | G10L 21/0208 |
| | | | | 704/233 |
| 2015/0199959 | A1* | 7/2015 | Skoglund | G10L 25/60 |
| | | | | 704/239 |
| 2015/0237199 | A1* | 8/2015 | Hameenniemi | H04M 3/2236 |
| | | | | 455/422.1 |
| 2016/0210984 | A1* | 7/2016 | Xiao | H04L 65/80 |
| 2016/0373944 | A1* | 12/2016 | Jain | H04W 24/02 |
| 2017/0270946 | A1* | 9/2017 | Kaniewska | G10L 21/0388 |
| 2019/0164052 | A1* | 5/2019 | Sung | G06N 3/088 |
| 2019/0172479 | A1* | 6/2019 | Xiao | G06F 17/18 |
| 2019/0180771 | A1* | 6/2019 | Yin | G10L 15/063 |

OTHER PUBLICATIONS

Avila, Anderson R., et al. "Non-intrusive speech quality assessment using neural networks." ICASSP 2019-2019 IEEE International Conference on Acoustics, Speech and Signal Processing (ICASSP). IEEE, 2019.*

Le Callet, Patrick, Christian Viard-Gaudin, and Dominique Barba. "A convolutional neural network approach for objective video quality assessment." IEEE transactions on neural networks 17.5 (2006): 1316-1327.*

Ge, Meng & Wang, Longbiao & Li, Nan & Shi, Hao & Dang, Jianwu & Li, Xiangang. (2019). Environment-Dependent Attention-Driven Recurrent Convolutional Neural Network for Robust Speech Enhancement. 3153-3157. 10.21437/Interspeech.2019-1477.*

ITU-T P.800 standard.*

* cited by examiner

EVALUATION OF SPEECH QUALITY IN AUDIO OR VIDEO SIGNALS

The present invention lies in the field of evaluating speech quality in video or audio signals by generating a score signal representing the quality, especially the speech quality of an audio or video signal.

Classical quality measurement techniques using concepts like signal-to-noise ratio etc. have been replaced with the rise for new technologies for telephone services that introduce new types of distortions, for example Voice-over-IP (VoIP).

The first international standard for the perceptional quality measurement of was PSQM benchmarked by the ITO-T. This method was standardized as ITU-T-recommendation P.861 in 1996. However, the scope of recommendation P.861 was limited to the assessment of telephone-band speech codex only.

A corresponding international standard for the perceptual quality measurement of wide-band audio signals is PEAQ (perceptual evaluation of audio quality). This method, standardized as ITU-R recommendation BS.1387.

A further model has been standardized as perceptual evaluation of speech quality (PESQ) by ITU-T recommendation P.862. Unlike other coding assessment models PESQ is able to predict subjective quality in a very wide range of conditions including coding distortions, errors, noise, filtering, delay and variable delay.

Figure 1:
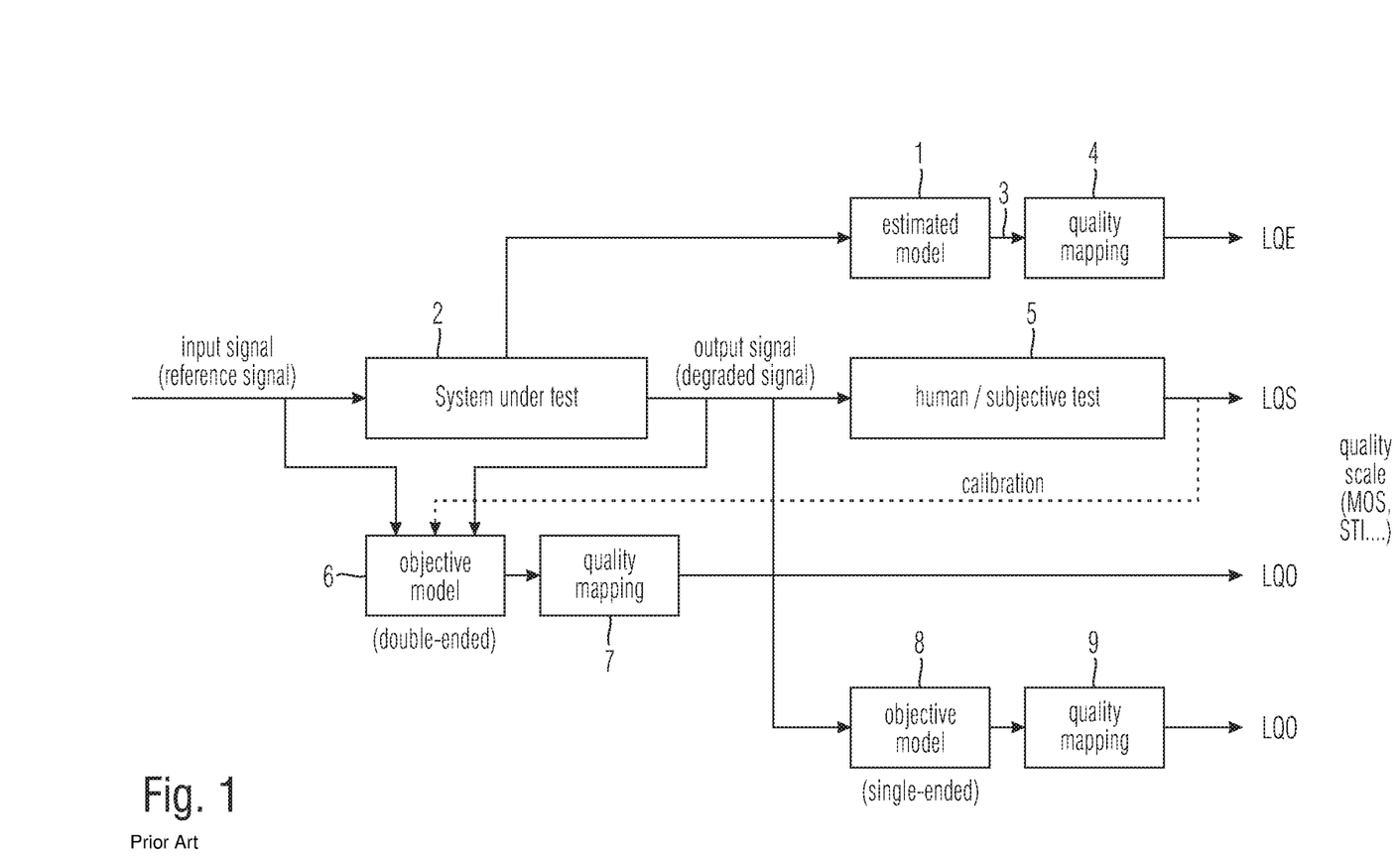
FIG. 1 shows a prior art system for producing each for these scores.

FIG. 1 shows known approaches from ITU-T Rec. 800.1 for producing speech quality scores representing the quality, especially the speech quality of an audio or video signal. The produced scores shown in FIG. 1 are:

LQE (Listen quality estimated)
LQS (Listen quality subjective)
LQO (Listen quality objective)

As shown in FIG. 1, an input signal, which is the reference (original) signal, is supplied to the system under test. An estimated module 1 estimating the characteristics of the system under test 2, is supplied with the reference signal and produces an output signal 3 for a quality mapping unit 4, producing the score LQE (Listen quality estimated).

The output signal of this system 2, which is typically a degraded signal, can be used for a human/subjective test in order to produce the score LQS.

The input signal (reference signal), together with the output signal (degraded signal) are furthermore supplied to a double ended objective model 6, the output of which is supplied to a further quality mapping unit 7 producing the score LQO.

Furthermore, it is known to use the output of the human/subjective test 5, i.e. the LQS score in order to calibrate the double-ended objective model 6.

Further, the output signal (degraded signal) is fed to a single-ended objective model 8, the output of which is fed to a quality mapping unit 9 producing the score LQO.

Figure 2:
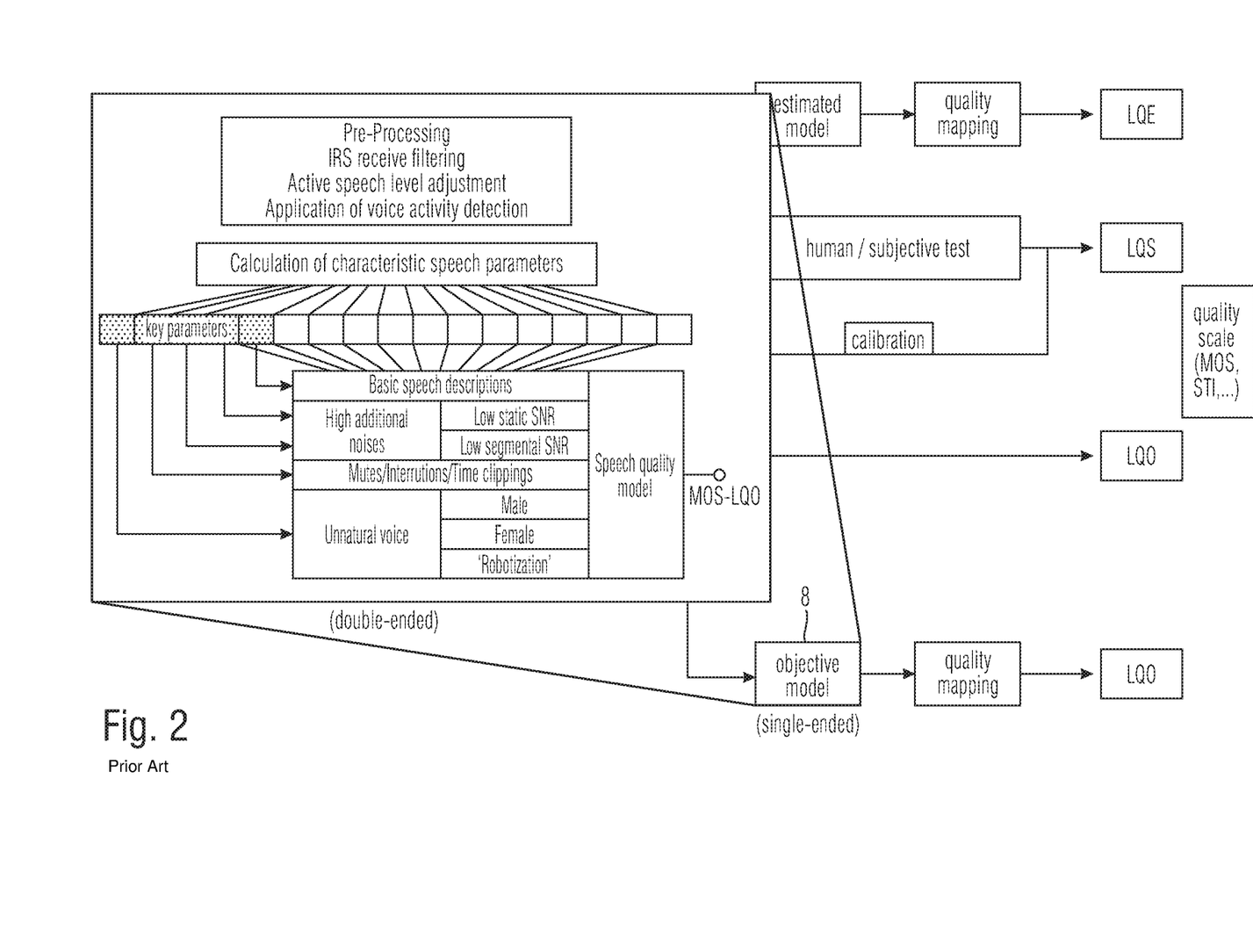
FIG. 2 shows the implementation of a single and objective model according to ITU recommendations.

FIG. 2 shows a possibility for implementing the single ended objective model 8.

Figure 3:
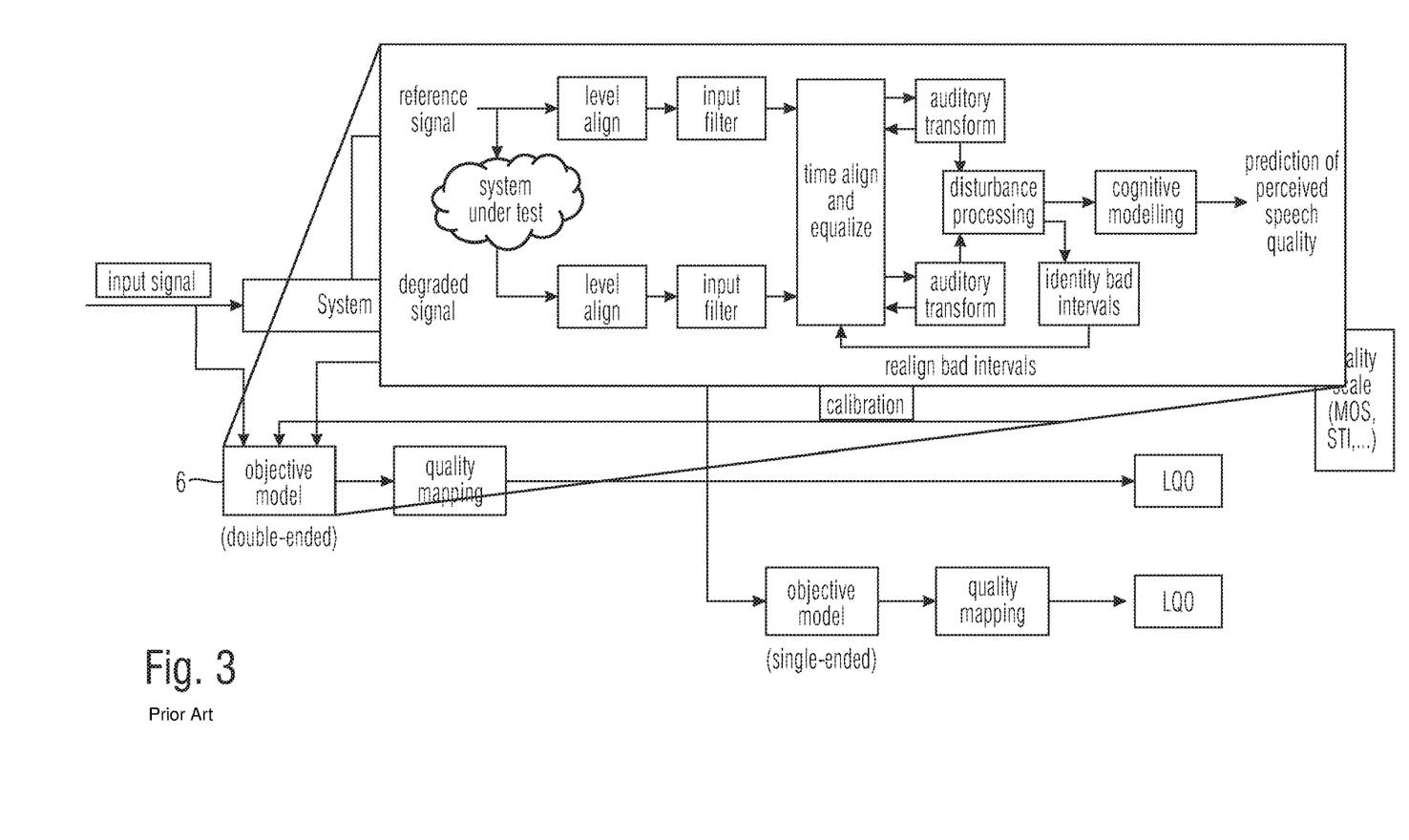
FIG. 3 shows the implementation of an objective model according to the PESQ algorithm.

FIG. 3 shows a known implementation for implementing the double-ended objective model 6 using a so-called PSQ algorithm, which is known in the prior art as such.

As can be seen from FIG. 1, especially the LQS score is the product of a human/subjective test.

WO9859509 teaches the use of neural networks as neural network estimators. The estimators according to this document receive a reference signal in addition to a recorded speech signal to be analyzed and do produce a LQE score.

The present invention now targets at the improvement of the generation of score signals representing the quality, especially speech quality, of an audio or video signal produced by a system such as for example VoIP.

This object is achieved by means of the features of the independent claims. The dependent claims developed further the central idea of the present invention.

According to an aspect of the invention, an apparatus for generating a score signal representing the quality of an audio or video signal supplied to the apparatus is proposed. The apparatus comprises an input for supplying an audio or video signal preferably containing speech information. The apparatus furthermore comprises a computing unit implementing a newer network. The computing unit is supplied with the audio or video signal and using the newer network produces a score signal representing the quality of an audio or video signal supplied. The score signal representing at least one predefined quality parameter of the audio or video signal. According to the invention, the newer network is set up by being trained with training data of a specific transmission standard and/or coding used for generating the audio or video data.

The signal is preferred maybe a digital audio signal and the score signal may represent the speech quality according to at least one of the following ITU-T speech quality testing methods: PESQ, PAQ or POLQ.

The score signal may represent simultaneously the score signal being the output notes of the newer network, may represent simultaneously the speech quality according to at least two ITU-T speech quality testing methods.

Preferably, the newer network is not supplied with a reference signal, i.e. a non-degraded version of the signal to be analyzed.

The signal may be a speech signal and the score signal may represent the ITU P.800 value LQS (listen quality subjective).

The newer network may be obtained by a sequence of supervised learning steps, the steps comprising:
Feeding an audio video signal to the newer network,
Video set audio signal in addition to an objective analytic quality testing device, together with a reference signal (for example using the PSQ algorithm) and
Comparing this core signal output by the newer network and the analytic quality testing device, respectively, and using the result of the comparison for training the newer network.
The apparatus may comprise a user interface for inputting information as to 1 or more of the transmission standard (coding or fading data) as to the supplied audio or video signal.

The audio signal maybe a VoIP signal.

A further aspect of the present invention relates to an apparatus for generating a score signal representing the quality of a speech signal supplied to the apparatus, the apparatus comprising:
An input for supplying a speech signal (digital) speech signal, and
A computing unit implementing a neural network. The computing unit is supplied with the audio video signal. The computing unit using the newer network, produces a source score signal representing the quality of an audio or speech signal supplied representing at least one predefined quality parameter of the speech signal. This score signal represents the ITU P.800 value LQS.

A yet further aspect of the invention relates to an apparatus for generating a score signal representing the quality of an audio or video signal to the apparatus the apparatus implements a Siamese network and comprises a:

A first newer network being supplied with a reference audio or video signal and design to generate a first output signal A second neural network being supplied with an audio or video signal for which a score signal is to be generated, and designed to generate second output signal, and A third neural network supplied with a first and second output signal, respectively and generating the score signal.

A yet further aspect of the invention relates to a computer-implemented method for generating a score signal representing the quality of an audio or video signal, comprising steps of:

Supplying an audio or video signal,

Supplying a neural network with the audio video signal, and producing a score signal representing the quality of an audio or video signal supplied, representing the score signal representing at least one predefined quality parameter of the audio video signal. Thereby the training data used for training the neural network ask specific for a transmission standard and/or codec used for generating the audio video signal.

Yet another aspect of the invention relates to a computer-implemented method for generating a score signal representing the quality of an audio or video signal. The method may comprise the steps of:

supplying a speech signal, supplying a trained neural network the speech signal, the neural network producing a score signal representing the quality of the speech signal supplied representing at least one predefined quality parameter of the speech signal, wherein the score signal represents the ITU P.800 value LQS.

Further aspects, features and advantages of the invention will now become evident by means of the following explanation of non-limiting embodiments of the invention, when taken in conjunction with the figures of the enclosed drawings.

Figure 4:
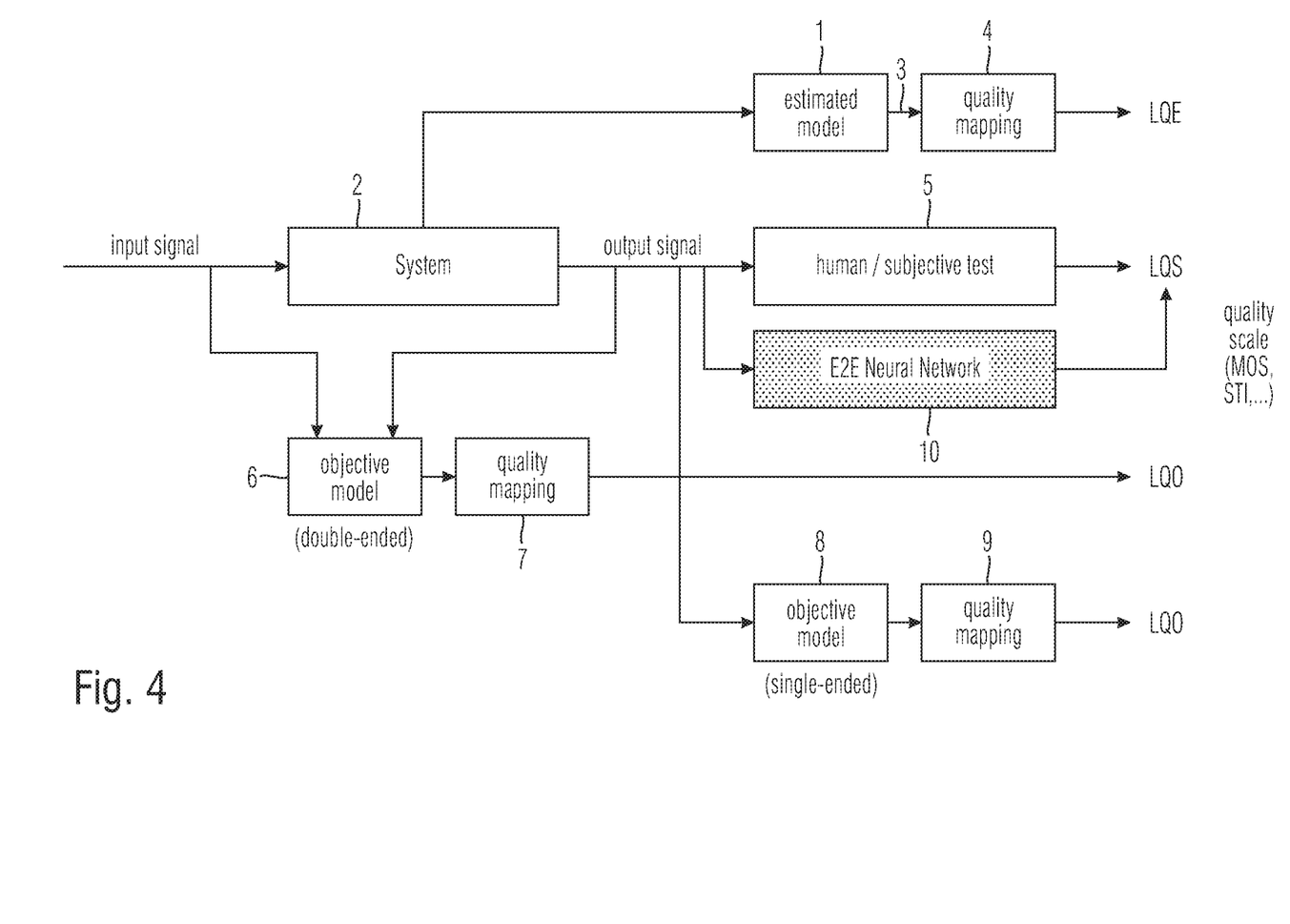
FIG. 4 shows an inventive system using a neural network for producing the LGS score.

Note that the system 2 according to the invention may be a system emulating a transmission standard. It may furthermore comprise a fading unit simulating different scenarios (urban, rural, . . . etc.). It may furthermore comprise a video/audio analyzer. The input signal may be an analog or a digital signal.

As can be seen by comparison to FIG. 1 according to this aspect the invention proposes to use a neural network 10, alternatively or in addition to the human/subjective test for producing for example the LQS score parameter. In other words, according to the invention, the output signal (feedback signal) of the system 2 under test is used as the input signal for a neural network 10, thus producing the LQS score in an objective manner. Note that the LQS score maybe produced by one or more of at least the following ITU methods:

PESQ
PEAQ
POLQA

Other measurements can be applied in addition or alternatively to the mentioned ones.

As can be seen from FIG. 4, preferably, no reference signal (input signal to the system under test) is required to be fed to the neural network 10.

Figure 5:
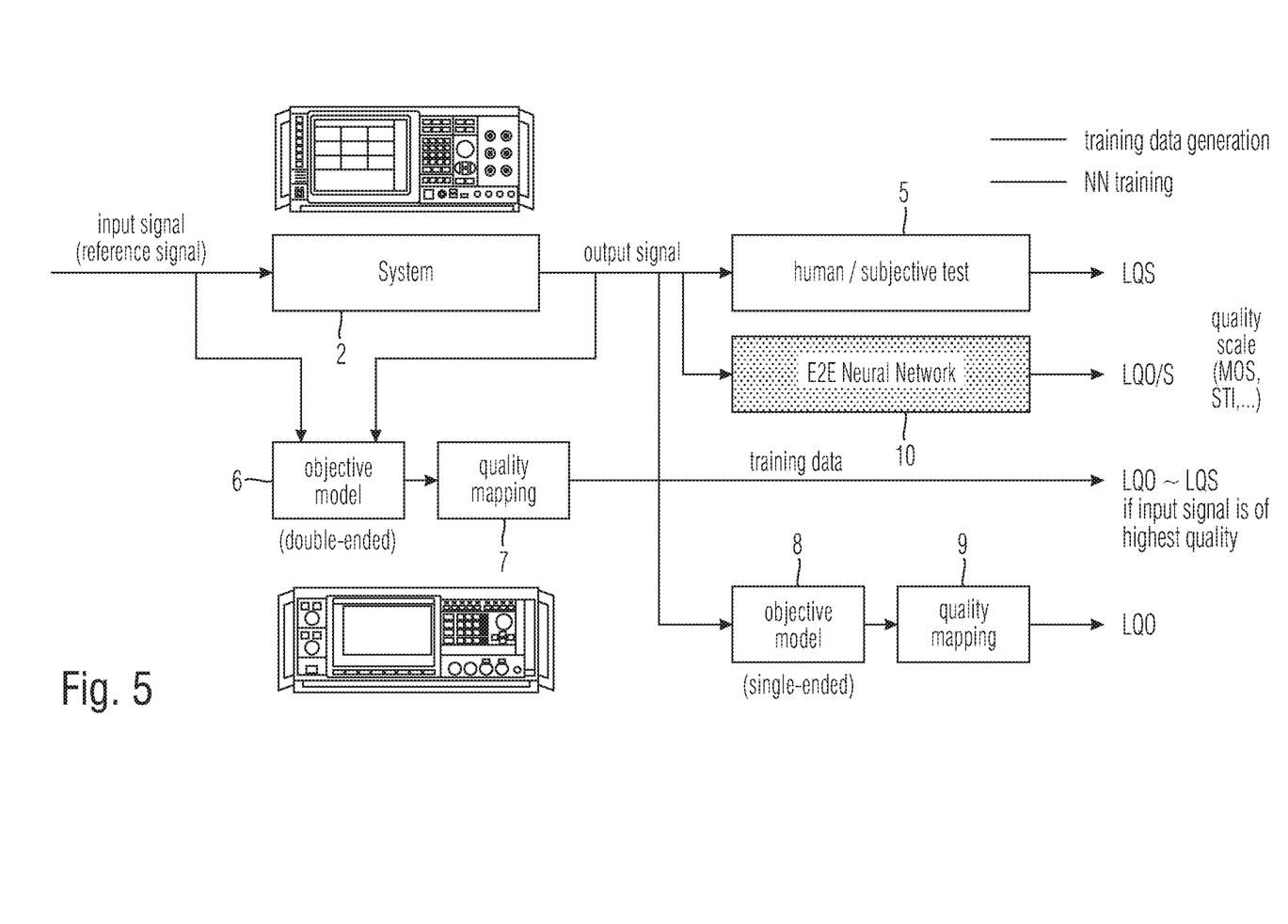
FIG. 5 shows the training of a neural network used in the invention, together with the production of training data.

As can be seen in FIG. 5, the neural network is trained for a specific system 2, i.e. preferably used for a system using a specific codec and/or transmission standard.

The codec may be e.g. one or more of
G.711
G.729
G.726
Ilbc
G.729a
G.723.1
G.728

During the training of the neural network, the output signal (degraded signal) of the system under test is used as an input signal for the neural network 10.

Furthermore, the reference signal (input signal) is also fed to the objective model 6, and an output thereof is used as training data by comparing these objectively produced training data with the output of the neural network 10. In methods known as such these training data can be used for supervised learning of the neural network 10. Preferably, thus, this neural network 10 is training using a specific codec and/or transmission standard (3G, 4G, 5G etc.).

Figure 6:
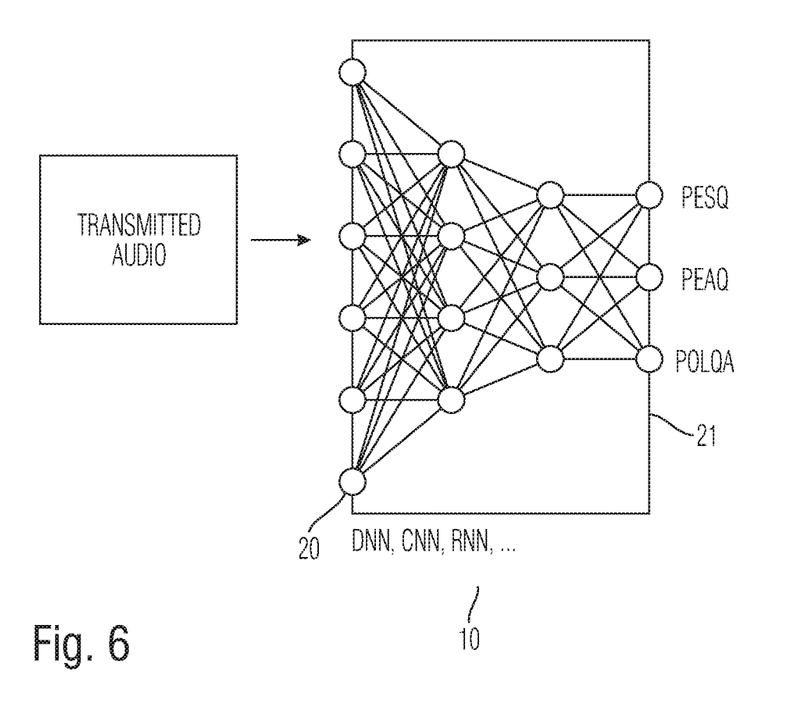
FIG. 6 shows the details as to a neural network used in the context of the present invention.

FIG. 6 shows a possible implementation of the neural network according to the invention. The neural network thus is a model of the human ear which is otherwise used for the human/subjective test file.

The neural network may be any of known neural network such for example a DNN, CNN or RNN.

The audio signal (which is the output signal/degraded signal) is fed to the input layer 20 of the neural network.

The output layer 21 of the neural network 10 produces a quality score, preferably the LQS quality score, according to one or more ITU measurement methods. Thus, the neuronal network 10 maps the supplied audio signal to one or more quality scores.

Preferably, a plurality of quality score values according to different ITU measurement methods is produced simultaneously, such for example values according to PESQ, PEAQ, and/or POLQA.

Figure 7:
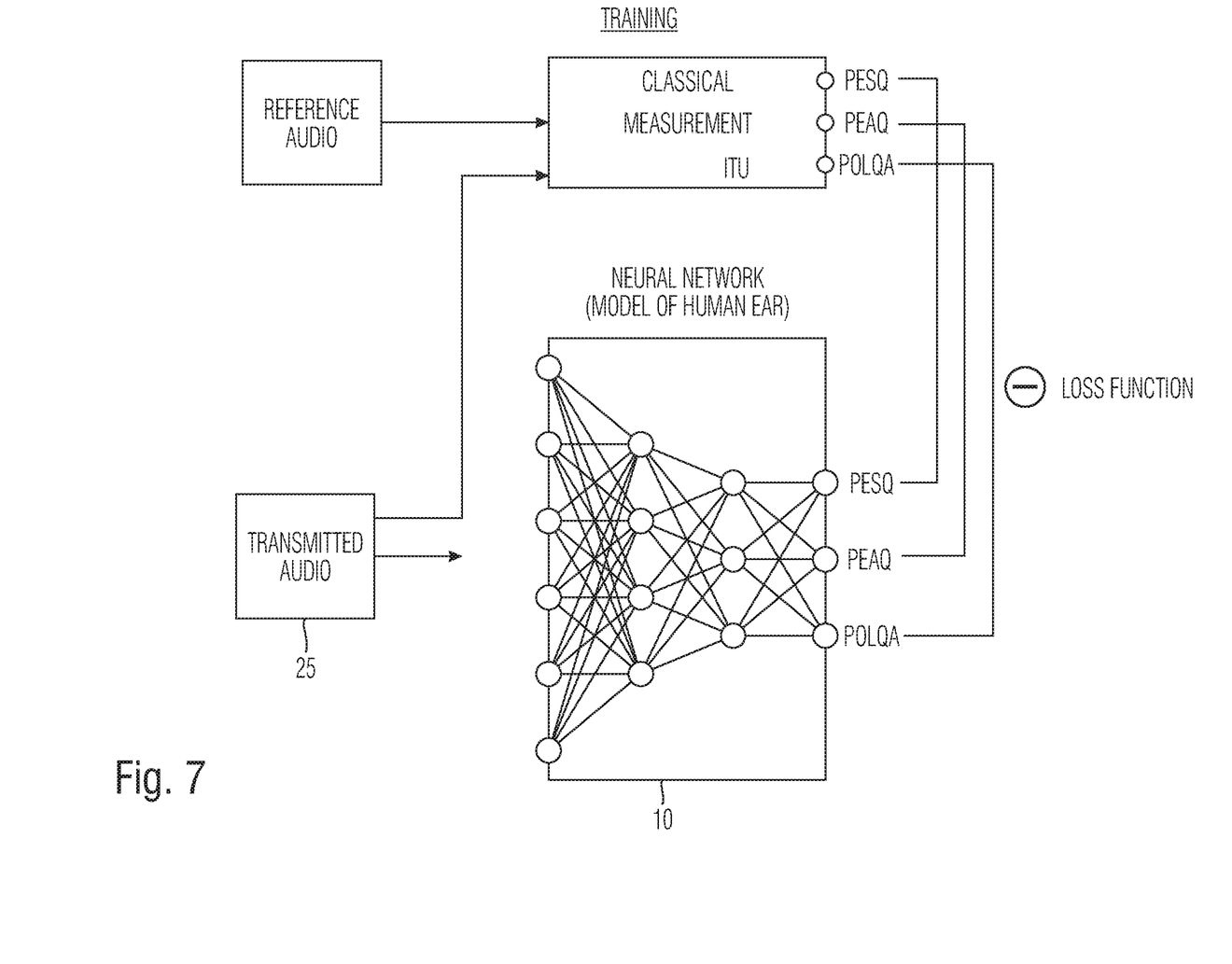
FIG. 7 shows details as to the training of the neural network of FIG. 6.

FIG. 7 shows in a simplified manner the training of the neural network 10.

The input layer of the neural network 10 is provided with the output signal, degraded signal, which may be a transmitted or stored audio file 25.

This degraded output signal, together with the input signal as reference signal, is also fed to a classical (objective) measurement according to for example ITU standards).

The output score value according to different ITU measurement methods, such as for example the PESQ, PEAQ and POLQA value are then to compared in order to produce a signal for supervised learning of the neural network 10.

Figure 8:
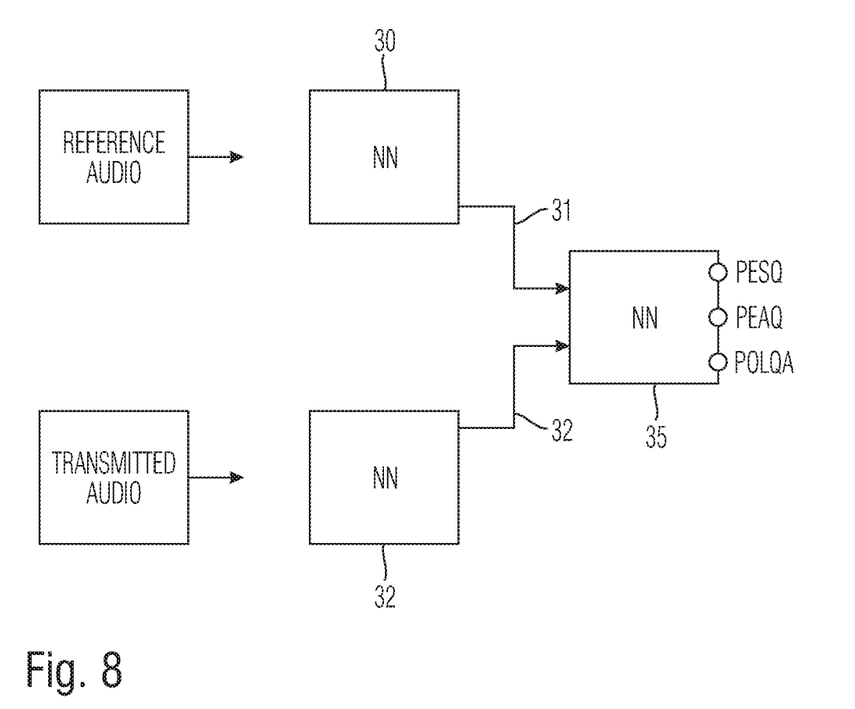
FIG. 8 shows an alternative embodiment in which the neural network is implemented as a so called Siamese (neural) network The general aspects of the present invention will now be explained with reference to FIG. 4.

In FIG. 8 alternative approach according to the invention is shown, in which a so called Siamese network is used for producing the (speech) quality scores, such as for example according to the PESQ, PEAQ or POLQA measurement method of the ITU.

According to this approach, the input signal (reference signal) is fed to a first neural network 30 producing a first output signal 31.

The degraded signal (transmitted audio signal) is fed to a second neural network 32, producing a second output signal 32.

The first and the second output signal 31, 32, respectively, are fed to a third neural network which produces the PESQ, PEAQ or POLQA values.

What is claimed is:

1. An apparatus for generating a score signal representing the quality of an audio or video signal supplied to the apparatus, the apparatus comprising:
    an input for supplying the supplied audio or video signal; and
    a computing unit implementing a neural network, the computing unit being supplied with the supplied audio or video signal, and producing a score signal representing the quality of the supplied audio or video signal, the score signal representing at least one predefined quality parameter of the supplied audio or video signal,
    the neural network being set up by being trained with training data of a specific transmission standard and/or codec used for generating data of the supplied audio or video signal;
    wherein the neural network simultaneously produces a plurality of quality score values according to different ITU (International Telecommunications Union) measurement methods, and
    wherein the supplied audio or video signal is a digital audio signal and the score signal represents simultaneously the speech quality according to at least two of the following ITU-T (International Telecommunications Union-Telecommunication Standard Sector) speech quality testing methods:
    PESQ (Perceptual Evaluation of Speech Quality);
    PEAQ (Perceptual Evaluation of Audio Quality); and
    POLQA (Perceptual Objective Listening Quality Analysis).

2. The apparatus of claim 1, wherein the neural network is not supplied with a reference signal.

3. The apparatus of claim 1, wherein the supplied audio or video signal is a speech signal and the score signal represents the ITU (International Telecommunications Union) P.800 value LQS (Listening Quality Subjective).

4. The apparatus according to claim 1, wherein the neural network is obtained by the following supervised learning steps:
    feeding a training audio or video signal to the neural network to obtain a first training output signal;
    feeding said training audio or video signal to an objective analytical quality testing device, together with a reference signal to obtain a second training output signal; and
    comparing the first and second training score signals output by the neural network and the analytical quality testing device, and using the result of the comparison for training the neural network.

5. The apparatus of claim 1, comprising a user interface for inputting information as to one or more of the transmission standard, codec and fading data as to the supplied audio or video signal.

6. The apparatus of claim 1, wherein the supplied audio or video signal is a VoIP signal.

7. An apparatus for generating a score signal representing the quality of a speech signal supplied to the apparatus, the apparatus comprising:
    an input for supplying a supplied speech signal; and
    a computing unit implementing a neural network, the computing unit being supplied with the supplied speech signal, and producing a score signal representing the quality of the supplied speech signal, the score signal representing at least one predefined quality parameter of the supplied speech signal,
    wherein the score signal represents the ITU (International Telecommunications Union) P.800 value LQS (Listening Quality Subjective),
    wherein the neural network simultaneously produces a plurality of quality score values according to different ITU (International Telecommunications Union) measurement methods, and
    wherein the LQS value is produced by at least two of the following ITU-T (International Telecommunications Union-Telecommunication Standard Sector) speech quality testing methods:
    PESQ (Perceptual Evaluation of Speech Quality);
    PEAQ (Perceptual Evaluation of Audio Quality); and
    POLQA (Perceptual Objective Listening Quality Analysis).

8. An apparatus for generating a score signal representing the quality of an audio or video signal supplied to the apparatus, wherein the apparatus implements a Siamese network and comprises:
    a first neural network being supplied with a supplied reference audio or video signal and designed to generate a first output signal;
    a second neural network being supplied with a supplied audio or video signal for which a score signal is to be generated, the second neural network being designed to generate a second output signal; and
    a third neural network supplied with the first and second output signal, respectively, and generating the score signal,
    wherein the third neural network simultaneously produces a plurality of quality score values according to different ITU (International Telecommunications Union) measurement methods, and
    wherein the supplied audio or video signal is a digital audio signal and the score signal represents simultaneously the speech quality according to at least two of the following ITU-T (International Telecommunications Union-Telecommunication Standard Sector) speech quality testing methods:
    PESQ (Perceptual Evaluation of Speech Quality);
    PEAQ (Perceptual Evaluation of Audio Quality); and
    POLQA (Perceptual Objective Listening Quality Analysis).

9. A computer-implemented method for generating a score signal representing the quality of an audio or video signal, comprising the steps of:
    supplying a supplied audio or video signal; and
    supplying a trained neural network with the supplied audio or video signal, the neural network producing a score signal representing the quality of the supplied audio or video signal, the score signal representing at least one predefined quality parameter of the supplied audio or video signal,
    wherein the training data for the trained neural network are specific for a transmission standard and/or codec used for generating the supplied audio or video signal, wherein the neural network simultaneously produces a plurality of quality score values according to different ITU (International Telecommunications Union) measurement methods, and wherein the supplied audio or video signal is a digital audio signal and the score signal represents simultaneously the speech quality according to at least two of the following ITU-T (International Telecommunications Union-Telecommunication Standard Sector) speech quality testing methods:

PESQ (Perceptual Evaluation of Speech Quality);
PEAQ (Perceptual Evaluation of Audio Quality); and
POLQA (Perceptual Objective Listening Quality Analysis).

10. A computer-implemented method for generating a score signal representing the quality of an audio or video signal, comprising the steps of:

supplying a speech signal; and supplying a trained neural network with the supplied speech signal, the trained neural network producing a score signal representing the quality of the supplied speech signal, the score signal representing at least one predefined quality parameter of the supplied speech signal, wherein the score signal represents the ITU (International Telecommunications Union) P.800 value LQS (Listening Quality Subjective), wherein the neural network simultaneously produces a plurality of quality score values according to different ITU (International Telecommunications Union) measurement methods, and wherein the LQS value is produced by at least two of the following ITU-T (International Telecommunications Union-Telecommunication Standard Sector) speech quality testing methods:

PESQ (Perceptual Evaluation of Speech Quality);
PEAQ (Perceptual Evaluation of Audio Quality); and
POLQA (Perceptual Objective Listening Quality Analysis).

* * * * *